PHOTOCHROMIC MEMORY IN WHICH MEMORY LOCATION IS SELECTIVELY HEATED DURING WRITE CYCLE

Filed May 31, 1968

INVENTORS
GERARD A. ALPHONSE &
ALINE AKSELRAD
BY Samuel Cohen
ATTORNEY 3,550,096

PHOTOCHROMIC MEMORY IN WHICH MEMORY LOCATION IS SELECTIVELY HEATED DURING WRITE CYCLE

Gerard A. Alphonse and Aline Akselrad, Princeton, N.J., assignors to RCA Corporation, a corporation of Delaware Filed May 31, 1968, Ser. No. 733,494
Int. Cl. G11c *13/04*
U.S. Cl. 340—173 9 Claims

ABSTRACT OF THE DISCLOSURE

Information is written into a particular location in a memory employing photochromic material whose sensitivity to light is temperature dependent, by heating that location and optically projecting an image at the heated location. The image may be a hologram of a large number of binary digits and may be stored in a relatively small area of the memory. Information may be nondestructively read out of the memory by projecting light at an appropriate frequency band at the location of interest while that location is at a relatively low temperature.

BACKGROUND OF THE INVENTION

There is a need in the computer industry for a very large capacity (about $10^9$ or more bits) memory which can be accessed at reasonable speed and whose information content readily can be altered. The object of this invention is to provide a memory which meets this need.

SUMMARY OF THE INVENTION

The storage medium of the memory of the invention is a photochromic storage medium maintained at a relatively low temperature. A source of heat, which preferably is the same source employed for producing the light required to write and read from the memory, is employed locally to heat a desired location in the memory and an image is optically projected at the heated location. The information stored in a memory location may be read out nondestructively by optical means during the time that location is at a relatively low temperature.

DETAILED DESCRIPTION

Figures 1, 2, 3, 4:
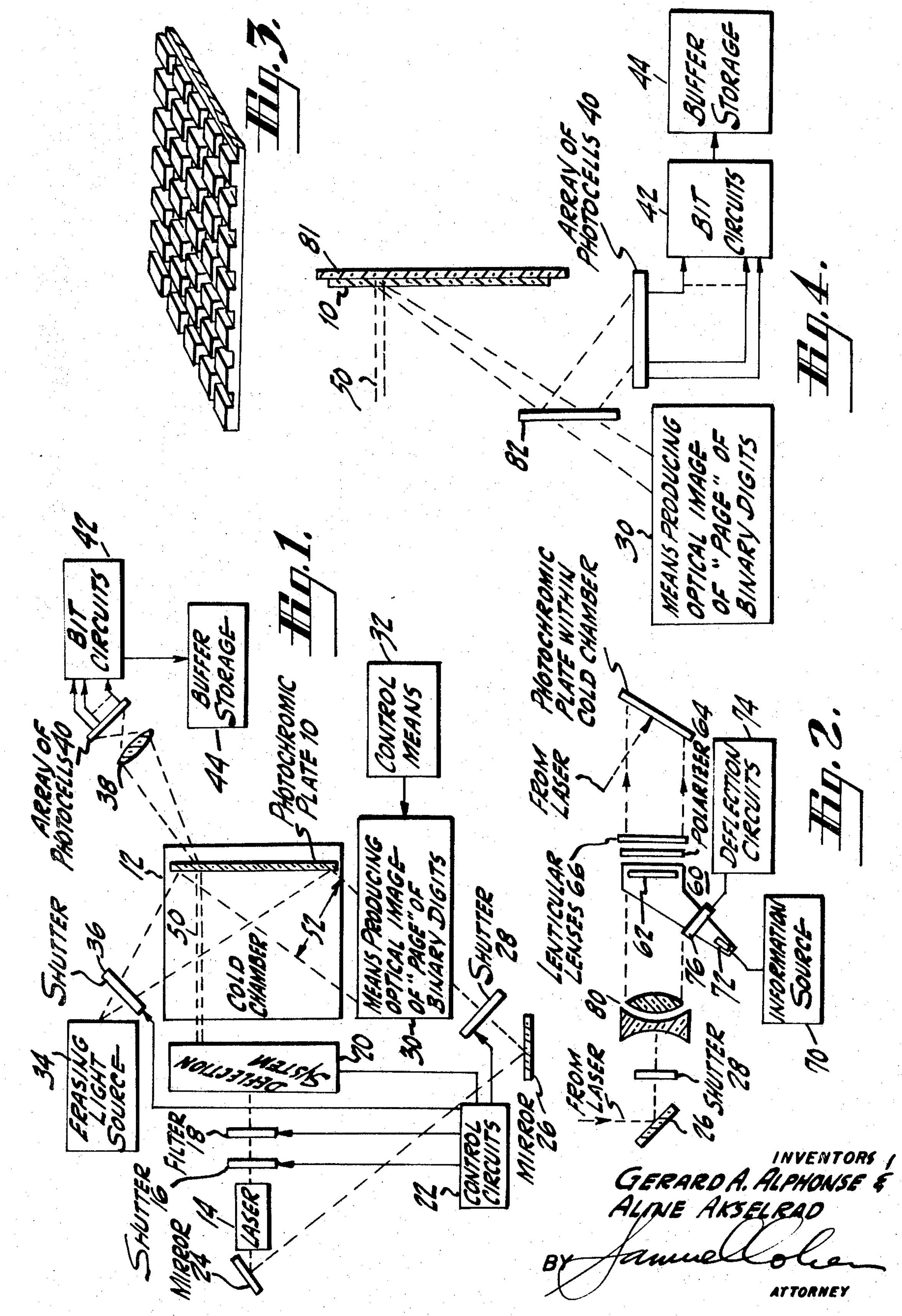
FIG. 1 is a block diagram of a memory system according to the invention.
FIG. 2 is a schematic showing of a portion of a preferred form of memory system according to the invention.
FIG. 3 is a more detailed showing of a portion of the photochromic memory plate.
FIG. 4 is a schematic showing of a portion of a modified form of the invention.

The memory system of FIG. 1 includes a photochromic plate 10 formed of a material whose sensitivity to light is very substantially affected by temperature. In more detail, at a relatively high temperature, the color of this material may be changed by applying light in an appropriate frequency range and at a relatively low intensity. As the temperature of the material is decreased, the intensity of the light required to change the color of the material must be increased very substantially. One example of a suitable memory material is hydrogenated, potassium-doped potassium bromide (KBr:K,H). Examples of other suitable photochromic materials are given later.

The plate 10 is located in a cold chamber 12 which may be maintained at some temperature between 77° Kelvin and 300° Kelvin, depending upon the photochromic material employed. The chamber either may have windows for permitting optical information to be applied to and read from the memory, or major portions of the system actually may be within the chamber.

The source of light employed both for writing and reading is laser 14. For a photochromic material such as KBr:K,H, the laser 14 may be a helium-neon laser which produces light at 6,328 A. or a Krypton laser which produces light at 6,471 A. In general, the laser should be one which operates at a frequency which is within the band corresponding to a peak in the absorption spectrum of the particular photochromic material being employed.

The light is projected through a shutter 16 and filter or attenuator 18 to deflection system 20. The shutter may be a mechanical shutter, however, it is preferably an electronic shutter. For example, the shutter 16 may be a light valve consisting of a Kerr cell and a polarizer. The filter 18 is a neutral density filter acting as a light attenuator; it is also preferably electronic in nature and while shown separately may be the shutter 16 with a voltage applied to the Kerr cell of a magnitude smaller than that required for complete rotation (smaller than that required for completely blocking the beam). The deflection system 20 may be mechanical in nature and may include lenses, mirrors and means for operating the mirrors to cause the laser beam to be directed at any desired location on the photochromic plate 10. Alternatively, the system 20 may be any one of a number of known electro-optical deflection systems as described, for example, in W. Kulke et al., "A Fast, Digital-Indexed Light Deflector," IBM Journal, vol. 8, No. 1, pp. 64–67, January, 1964, or in T. J. Nelson, Bell System Technical Journal, "Digital Light Deflection," vol. 42, No. 3, pp. 821–845, May, 1964. The operation of the shutter, filter and deflection system is under the control of the control circuits 22.

The output of the laser 14 is also applied via mirrors 24 and 26 and shutter 28 to the means 30 producing an optical image of a page of binary digits. This means may be electro-mechanical in nature as, for example, is described in application Ser. No. 515,531 for Hologram Memory System, filed Dec. 22, 1965, by R. S. Mezrich, et al. and assigned to the same assignee as the present application. In brief, this means may include a roll of film, each frame of which consists of a matrix of opaque and transparent areas which represent binary digits. Each frame may, for example, store of the order of from $10^2$ to $10^4$ or more bits. Means are also included within block 30 for driving the film until a desired frame is reached under the control of the control means 32.

As an alternative, block 30 may be electronic in nature and may include the elements of FIG. 2. These will be discussed in detail later.

The system of FIG. 1 also includes an erasing light source 34 which for KBr:H,K may be an ordinary source of ultraviolet light. A shutter 36 operated under the control of the control circuits 22 is located between the source 34 and the photochromic plate 10.

The read out means for the system of FIG. 1 includes a lens system illustrated schematically by the single lens 38 and an array of photocells 40 equal in number to the number of bits on the "page." These photocells are so located that each receives the image of one binary digit. If the digit is manifested by a transparent square on the "page," representing, for example, binary 1, a photocell for that digit is actuated (illuminated) and produces an output, and if the digit is manifested by an opaque square on the page, representing a 0, the photocell for that digit remains dark during readout and produces no output.

As an alternative to the arrangement above, a mirror 81 may be placed on the back surface of the photochromic plate 10 as shown in FIG. 4, to provide a real image without lenses at the location of the "page composer" 30. The array of photocells 40 may then be located at the page composer, or at some other convenient place such that it recieves the image of the page of bits after reflection from a semitransparent, half-silvered mirror 82, as shown in FIG. 4.

In both embodiments, the photocells are connected to the bit circuits 42 and the latter may be connected to a buffer storage circuit 44. The use of a buffer is advantageous in some systems as it can store the bits of one page while the photocells are being employed to read a second page. The bit circuits may take one of many different forms depending upon how the memory is operated. As a simple example, the bit circuits may include amplifiers for each bit of the page and these amplifiers may be connected through gates to the respective stages of the buffer storage system 44. As another alternative, the bit circuits may include means for reading a word at a time from the array of photocells 40 and applying that word to a buffer storage system having a capacity of one word. As a typical example, a word of a $10^4$ bit page may contain 64 bits and the buffer storage system may have a capacity of 64 bits. In a system of this kind, the bit circuits 42 include means such as gates or a scanner for selecting the 64-bit word from the $10^4$ bits and the means for applying this word to the buffer storage system. Circuits of these types are known in the art and since they are not, per se, part of the present invention, they need not be discussed further.

In the operation of the system of FIG. 1, the control circuits 22 initially cause the deflection system 20 to be set to deflect the laser beam to a desired location in the memory. During this time, the shutter 16 and filter 18 are open to pass the full intensity of the light produced by the laser 14. Assume for the moment that the laser is a one-watt Krypton laser with a beam area of 10 millimeters square reduced by appropriate optics to a beam cross section of 1 millimeter square. Assume also that the cold chamber is at 300° Kelvin (0° centigrade). A beam of this cross section and intensity will heat a 1 millimeter square storage location of the photochromic plate 10 from 300° Kelvin to 400° Kelvin in less than 0.1 second, if the photochrome 10 is KBr:K,H. The heating speed readily may be increased by employing a more powerful laser. The heating of the storage location by the laser beam sensitizes the photochromic material at that location and makes it available to accept information. It may be assumed for the moment that the location being addressed previously was erased so that it is available to receive this information.

After the storage location has attained the desired temperature, the control circuits 22 open the shutter 28. The laser beam reflected by mirrors 24 and 26 is applied through the shutter to the page of optical information such as the frame of film already described. An image of this page of bits is projected onto the entire surface of the photochromic plate 10. However, only the area being addressed by deflection system 20 is sensitized and only this area can accept this information. This location receives both the deflected beam 50 and a portion of the information beam 52 so that an interference pattern, known as a hologram, is formed there. (A more detailed explanation of how a hologram is formed appears in the copending application mentioned above.) After a period sufficient to expose the photochromic plate, the shutters 16 and 28 are closed and the storage location formerly addressed is allowed to cool. For KBr:K,H, the exposure time (the time during which the shutter 28 is open) is such that the hologram location receives about 0.15 joule from the deflected beam 50 and the portion of the information beam 52. For a one-watt laser, the exposure time amounts to about 0.15 sec. The holographic information stored now will continue to be stored for a very long period—months or years, depending upon temperature and photochromic material.

The stored information may be read out by again opening the shutter 16 and adjusting the filter 18, both by means of the control circuits 22, so that the amount of laser light reaching the deflection system is pherhaps one-one hundredth of its former value. The control circuits cause the deflection system 20 to direct this laser light to the desired memory location. When illuminated by the light, the real image of the stored hologram is projected by lens system 38 onto the array of photocells 40. (In FIG. 4, the real image is reflected from semitransparent mirror 82 onto the array of photocells 42.) The photocells thereupon produce outputs in parallel indicative of all of the bits stored on the page. The bit circuits 42 then select some or all of this information and apply it to the buffer storage system 44.

In the readout process, the laser beam does not appreciably heat the location being read. Therefore, the readout is nondestructive and this is an important advantage in many applications. Also, the readout speed is high. It can be in the order of tens to hundreds of nanoseconds, depending upon the speed of the deflector and the photocells.

Information stored in the photochromic plate 10 may be erased by opening shutter 16 and filter 18 and closing shutter 28. The deflection system 20 then applies a laser beam at full power to the location it is desired to erase. At the same time, the control circuits 22 open the shutter 36 so that erasing light, such as incoherent (or coherent) ultraviolet light, is applied to the heated storage location. While the frequency of the erasing light is not critical, it should be within the band corresponding to a peak in the absorption spectrum of the photochromic material. Just as in the case of writing, the erasing light is applied over the entire area of the photochromic plate 10, however, as only one location is sensitized by the heating beam 50, only that location is erased. The remaining locations are cold and they continue to store the information previously written into these locations.

As an alternative to the erasing system described above an optical arrangement can be used to pass the erasing light from source 34 at full concentration through the deflector 20 after suitable heating with the beam 50. This arrangement can reduce the erasing time by a factor equal to the number of holograms in the memory.

A preferred, all-electronic means for producing a page of binary digits is illustrated in FIG. 2. It includes an electro-optic light valve type cathode ray tube 60 at the anode end of which is a plate 62 of electro-optical material. Element 62, for example, may be a potassium dihydrogen phosphate (KDP) crystal. A polarizer 64 and lenticular lens 66 are located beyond the cathode ray tube face.

In the operation of this tube, information source 70 applies to the electron gun illustrated schematically at 72, intensity modulated signals indicative of the bits on a page. Concurrently, the deflection circuits 74 apply to the deflection means illustrated schematically at 76, the X and Y deflection waves required to deflect the intensity modulated beam, in television raster fashion, over the back surface of the crystal 62. The result is to deposit a charge on the back surface of crystal 62 corresponding to the pattern of 1's and 0's making up the page of information.

The light from laser 24 reflected from mirror 26 through shutter 28 is broadened into a beam by the lens system shown schematically at 80. As is well understood, this laser light is polarized in a given direction. The electro-optical crystal 62 changes the plane of polarization of this light in those regions of the crystal which are charged but not at those regions of the crystal which are not charged. The thickness of the crystal may be such that the plane of polarization is rotated through 90°.

The polarizer 64 is so oriented that it passes the polarized light corresponding to the charged areas of the crystal which may represent binary 1, for example, and blocks the polarized light which passes through the uncharged areas of the crystal. These areas may represent binary 0, for example. The light pattern thereby obtained consisting of light and dark areas, is applied via the lenticular lenses 66 to the photochromic plate 10. The lenses perform a function similar to that of the diffuser mentioned in the copending application, however, the lenses are somewhat more efficient in that they do not spread out the light as much as an ordinary diffuser does.

The explanation above of the operation of the electro-optic cathode ray tube 60 is somewhat brief and, in addition, only the principal elements of the tube are shown. A more detailed explanation may be found in copending application Ser. No. 673,616, for A Color Image Projection System, filed Oct. 9, 1967, by D. H. Pritchard and assigned to the same assignee as the present application. This application describes a somewhat more complex tube than is required for purposes of the present invention. However, its general teachings, especially FIG. 5, are applicable. Note that in the tube of the present application, the various color filters shown in the Prichard application are not needed.

The structure of a preferred form of photochromic plate for the system of the present invention is shown in FIG. 3. It consists of a plate formed with grooves in the X and Y directions which define raised areas, each the size of a memory location. The purpose of the grooves is to prevent local cracking of the plate due to rapid volume expansion during the rapid temperature change when the plate is "blasted" with the relatively high power laser beam. The grooves also prevent spreading of the heat from one location to the next adjacent location. The grooves may be coated with a metallic layer of high thermal conductivity to provide even better heat dissipation.

As an example of the above, the plate may be 1.0 mm. in thickness, the grooves 0.1 mm. wide and 0.5 mm. deep and the grooves may be spaced 0.9 mm. apart. The plate may be 30 cm. x 30 cm. and this provides a memory having a capacity of 0.9 x $10^9$ bits.

The photochromic material may be manufactured in one of a number of different ways. Using KBr:K,H as an example, this material may be prepared by heating the pure KBr crystal at about 690° C. in a furnace as described, for example, in C. Z. Van Doorn, "Method for Heating Alkali Halides and Other Solids in Vapors of Controlled Pressure," Rev. Sci. Instru. 32, 755, 1961, in a presence of a low pressure (10 mm. Hg) of potassium to create F-centers (color blue) capable of absorbing (red) light at a peak of 6,300 A. at room temperature. These F-centers consist of single electrons trapped in bromine vacancies. The material then may be heated in another furnace at about 600° C. in an atmosphere of hydrogen at about 600 p.s.i., as described in, for example, Schulman and Compton, "Color Centers in Solids," Pergamon Press, New York, 1962. The hydrogen atoms then diffuse into the crystal and combine with the F-centers electrons to form $H^-$ ions called U-centers (colorless) which are capable of absorbing ultraviolet light at 2,300 A. The absorption of ultraviolet light by the now colorless material causes the H atoms to be dislocated and to travel to interstitial locations, leaving the original electrons behind as F-centers, and the material becomes blue. Upon exposure to red light, the F-center electrons are excited out of the traps and are captured by the interstitial hydrogen and the newly-formed hydrogen negative ion falls back into the trap to recreate the U-center. The reversible photoreaction is $$U \underset{6{,}300\ \text{A.}}{\overset{2{,}300\ \text{A.}}{\rightleftarrows}} F$$

The rate of this reaction is a measure of the efficiency of these processes and is a function of temperature. In the U-F process, the rate depends on the diffusion rate of the $H^-$ ion which is temperature dependent; in the F-U process, the electron that is excited by the light is not free to leave the F-center unless the temperature is sufficiently high for thermal excitation into the conduction band of the crystal. Typically, at 90° C. the optical energy required for causing a 20% change of transmission may be about 0.15 joule, whereas at 0° C. one would need more than 100 times more energy.

Examples of other photochromic materials with temperature dependent photobleach sensitivity, which are suitable for use in the present invention are Corning Photochromic glass, which is described in G. K. Megla, "Optical Properties and Applications of Photochromic Glass," Applied Optics, vol. 5, No. 6, pp. 945–960, June, 1966, and the organic photochromic materials such as the spiropyrans described by E. Berman et al. in, "Photochromic Spiropyrans," J. Am. Chem. Soc. 81, 5605, (1959).

What is claimed is:

1. A memory comprising in combination:

a photochromic medium maintained at relatively low temperature; and means for writing information onto a location in said medium comprising means for substantially heating said location while the remainder of said medium is maintained at said relatively low temperature and means for optically projecting information onto said heated location.

2. A memory as set forth in claim 1 further including means for reading from said memory comprising means for illuminating a location in said memory while said location is at its relatively low temperature, and means for optically sensing the information thereby obtained.

3. A memory as set forth in claim 1 further including means for erasing information stored at a location of said memory comprising means for selectively heating said location and means for optically projecting erasing light onto said heated location.

4. A memory as set forth in claim 1 wherein said memory comprises a plate of photochromic material formed with crossed grooves, each memory location being surrounded by four grooves.

5. A memory as set forth in claim 1 wherein the means for writing comprises means for writing holograms at the respective locations of said memory.

6. A memory as set forth in claim 5 wherein said heating means comprises a source of coherent light which serves also to provide the reference beam employed in creating said holograms.

7. A memory comprising, in combination:

a photochromic medium maintained at a relatively low temperature;

means for heating a restricted region of said medium comprising means for producing coherent light and for projecting said light at said region at an intensity sufficient to heat that region to a relatively high temperature; and means for optically projecting information onto said region during the time it is being heated by said coherent light comprising means for deriving from said coherent light producing means an information beam and projecting that beam through a source of optical information and onto the heated region to produce at said region a hologram.

8. A memory as set forth in claim 7 wherein said source of optical information comprises an electro-optical cathode ray tube.

9. A memory as set forth in claim 7, further including readout means, said readout means including said coherent light producing means and means for reducing the intensity and exposure time thereof to avoid substantial heating of said photochromic material during readout.

References Cited

UNITED STATES PATENTS

| | | | |
|---|---|---|---|
| 2,975,291 | 3/1961 | Loebner et al. | 340—173X |
| 3,296,594 | 1/1967 | Van Heerden | 340—173X |
| 3,440,621 | 4/1969 | Knapp | 340—173 |
| 3,447,138 | 5/1969 | Carson et al. | 340—173 |

OTHER REFERENCES

D. R. Bosomworth et al.: "Thick Holograms in Photochromic Materials," Applied Optics, vol. 7, No. 1, January, 1968, pp. 95–98.

TERRELL W. FEARS, Primary Examiner

U.S. Cl. X.R.

350—160